US009230417B2

(12) United States Patent
Reilly et al.

(10) Patent No.: US 9,230,417 B2
(45) Date of Patent: Jan. 5, 2016

(54) ALERT DEVICES AND SYSTEMS

(71) Applicant: Jagged Brick LLC, Branchville, NJ (US)

(72) Inventors: Brick Arthur Jay Reilly, Springfield, NJ (US); Jamie Adrian Gillem, Branchville, NJ (US)

(73) Assignee: JAGGED BRICK LLC, Branchville, NJ (US)

( * ) Notice: Subject to any disclaimer, the term of this patent is extended or adjusted under 35 U.S.C. 154(b) by 0 days.

(21) Appl. No.: 14/297,122

(22) Filed: Jun. 5, 2014

(65) Prior Publication Data

US 2014/0361881 A1 Dec. 11, 2014

Related U.S. Application Data

(60) Provisional application No. 61/831,583, filed on Jun. 5, 2013.

(51) Int. Cl.

| | |
|---|---|
| ***H04B 3/36*** | (2006.01) |
| ***G08B 6/00*** | (2006.01) |
| ***A42B 3/04*** | (2006.01) |

(52) U.S. Cl.
CPC .. *G08B 6/00* (2013.01); *A42B 3/046* (2013.01)

(58) Field of Classification Search
CPC .................................. G08B 6/00; G08B 23/00
USPC ................... 340/407.1, 573.1, 4.12, 7.58, 7.6
See application file for complete search history.

(56) References Cited

U.S. PATENT DOCUMENTS

| | | | | |
|---|---|---|---|---|
| 8,461,983 B2 * | 6/2013 | McCauley | ............... | 340/539.13 |
| 8,519,834 B2 * | 8/2013 | Jersa et al. | ................. | 340/407.1 |
| 8,648,712 B2 * | 2/2014 | Pottle et al. | .............. | 340/539.11 |
| 2002/0145522 A1 * | 10/2002 | Pembroke | .................. | 340/573.1 |

* cited by examiner

*Primary Examiner* — Toan N Pham
(74) *Attorney, Agent, or Firm* — Timothy X. Gibson, Esq.; Gibson & Dernier LLP

(57) ABSTRACT

Wireless communication devices and systems are disclosed which provides for simple yet effective communications between co-workers in areas of high ambient noise. Devices are provided which are operable to use vibration to provide an alert to a wearer of the device, the device including a transmitter/receiver unit, a transmit button operably connected to the transmitter/receiver unit and at least one vibration device operably connected to the transmitter/receiver unit. The device may be positioned inside or on a hard hat or other headgear of a worker.

16 Claims, 4 Drawing Sheets

ALERT DEVICES AND SYSTEMS

CROSS-REFERENCE TO RELATED APPLICATIONS

This application claims the benefit of U.S. Provisional Patent Application No. 61/831,583 filed Jun. 5, 2013, the entirety of which is incorporated herein by reference.

FIELD OF THE INVENTION

The invention relates to the field of alert devices and specifically, to alert devices and systems including a receiver/transmitter and vibration unit.

BACKGROUND OF THE INVENTION

Noisy work environments do not always lend themselves to easy communication between co-workers. For example, logging and tree service workers are constantly working amid the noise of power saws, heavy equipment, etc. Exposure to loud noise over time also tends to reduce the hearing ability of such workers. Protective devices such as earplugs also serve to reduce the ability of workers in such environments to hear warnings and communications from co-workers. Such environments pose immediate dangers to workers, who must often rely on their fellow workers to warn them of danger. Effective and reliable communication among co-workers in such environments is essential.

SUMMARY OF THE INVENTION

There is a substantial need for a system and apparatus that provides simple, reliable communication between such co-workers in noisy environments.

In accordance with one embodiment, a short range, a wireless communication device is disclosed which provides for simple yet effective communications between co-workers in areas of high ambient noise. The device uses vibration rather than sound or light to alert someone of potential danger. The practicality and necessity of a device like this in fields like tree care, utilities, construction, etc. are evident in the fact that there is no good way to start communication with everyone on the crew when the equipment on the jobsite makes it impossible to hear the workers. In some embodiments, the device may be completely unobtrusive in that it may be positioned inside or on a hard hat or other headgear of a worker and can be used with no more effort than pushing a button. It doesn't interfere with work and is not reliant on transmission towers to be in the area. There is virtually no lag time from when the transmit button is pushed to when the vibration device is activated, which is very important in high-risk environments.

In accordance with an embodiment, a personal alert device is provided which is operable to use vibration to provide an alert to a wearer of the device, the device including a transmitter/receiver unit, a transmit button operably connected to the transmitter/receiver unit and at least one vibration device operably connected to the transmitter/receiver unit.

The communication device may include a housing, transmitter/receiver unit including a wireless transmitter, a wireless receiver, an antenna such as an FM frequency antenna, and a control module (which may be referred to herein as a microcontroller). The transmitter/receiver unit is operable to receive and transmit signals on multiple frequencies and may include a multi-channel switch, display screen, rechargeable battery and a recharging port. In one embodiment the device employs short-range broadcast frequencies. By avoiding use of long range broadcast frequencies, radio traffic issues are avoided and workers using the device are unlikely to encounter interference.

When the transmit button is depressed by a user of the device, a signal is sent to another user of a similar device, activating the vibration device of the other user. Thus, a worker using the device is able to transmit a signal to another worker, alerting the other worker to make eye contact with the worker transmitting the signal. The vibration provides an instant alert in situations where verbal communications are ineffective or impossible, such as in noisy environments.

In one embodiment the transmit button and/or the vibration device may be removably connectable to the transmitter/receiver unit.

The vibration device may be a vibration motor such as a coin vibrating motor. The device may include a vibration device positioned within the housing and operable to vibrate upon receipt of a signal by the transmitter/receiver unit. In another embodiment, a vibration device is mountable to a position remote from the transmitter/receiver unit. Similarly, the transmit button may be mountable to a position remote from the transmitter/receiver unit.

In one embodiment the device is mountable on a helmet, hardhat or headwear of a worker. In use, a signal sent from one hard hat to another hard hat alerts the wearer of the hard hat via vibration to make eye contact with the other hard hat, for example, to indicate possible danger such as a falling tree, branch, etc.

In another embodiment, a helmet is disclosed including a personal alert device operable to use vibration to provide an alert to a wearer of the helmet, the device including a transmitter/receiver unit mounted to the helmet, a transmit button operably connected to the transmitter/receiver and mounted to the helmet, and at least one vibration device operably connected to the transmitter/receiver unit and mounted to the helmet, wherein the at least one vibration device is mounted in a position on the helmet operable to provide a vibratory sensation to the head of a wearer of the helmet upon vibration of the vibration device. The transmitter/receiver unit may include a housing, a wireless transmitter, a wireless receiver, a control module and an antenna. In one embodiment the transmitter/receiver unit is operable to receive and transmit signals on multiple frequencies and includes a multi-channel switch. In another embodiment at least one of the transmitter/receiver unit, transmit button and vibration device may be removably mountable to the helmet. The transmit button is desirably mounted to a front edge of the helmet, under a brim, or other position readily accessible to a worker.

In another embodiment a communication system is disclosed including a plurality of personal alert devices, each of the devices operable to use vibration to provide an alert to a wearer of one of the plurality of the devices, each of the plurality of personal alert devices including a transmitter/receiver unit, a transmit button operably connected to the transmitter/receiver and at least one vibration device operably connected to the transmitter/receiver unit. The transmitter/receiver unit may include a housing, a wireless transmitter, a wireless receiver, a control module and an antenna and be operable to receive and transmit signals on multiple frequencies and comprises a multi-channel switch.

BRIEF DESCRIPTION OF THE DRAWINGS

So that those having ordinary skill in the art will have a better understanding of how to make and use the disclosed systems and methods, reference is made to the accompanying figure wherein.

DETAILED DESCRIPTION OF THE INVENTION

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

Figure 1:
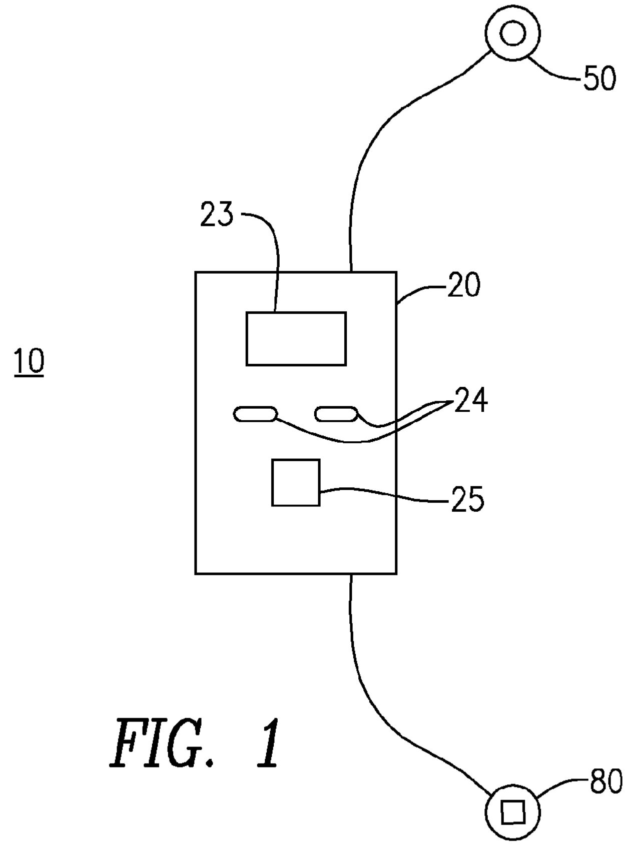
FIG. 1 is a front view of a device in accordance with one or more embodiments of the disclosed subject matter.
Figure 1A:
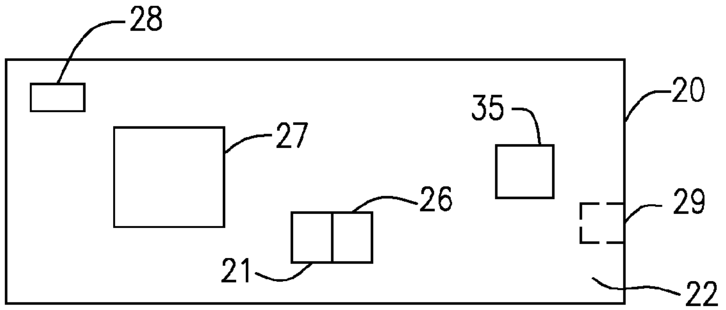
FIG. 1A is a schematic view of a device in accordance with one or more embodiments of the disclosed subject matter.

Now referring to FIGS. 1 and 1A, a personal alert device 10 is provided which is operable to use vibration to provide an alert to a wearer of the device 10. The alert is provided by a wireless signal sent by a device 10 used by another user of a similar or same device. The device 10 is desirably used in noisy environments or anywhere and for any reason the ability to hear an audible warning would be compromised.

In one embodiment the device 10 includes a transmitter/receiver unit 20, transmit button 50 and vibration device 80. The transmitter/receiver unit 20 may include a housing 22, a wireless transmitter 21 and receiver 26, a control module 27, an antenna 28 such as an FM frequency antenna 28, a multi-channel switch 24, and power on/off switch 25. The transmitter/receiver unit 20 may further include a display screen 23 such as a LCD screen to display channel, battery power, etc. The transmitter/receiver unit 20 may receive power from, and may include, a battery such as a rechargeable battery 35. Housing 22 may include a recharging port 29 to receive for example a USB charging connector. The transmitter/receiver unit 20 may be any suitable size. In one embodiment the housing is 0.5 to 4 inches in width and 0.5 to 4 inches in length, and about 0.1 to about 2 inches in thickness.

The transmit button 50 is a tactile/depressible, momentary push switch which may be connected to the unit 20 such as via an insulated wire pigtail of any suitable length wired directly to the main PCB or via removable plug/outlet/jack. The transmit button 50 can be any commercially available tactile/depressible/momentary switch that best fits the design of the device 10. It will be apparent to the skilled artisan the transmit button 50 and vibration device 80 may be attached directly to the unit 20 without wire pigtails. When depressed the transmit button 50 allows current to flow through the switch which is then sent to the control module 27 which in turn sends voltage to the transmitter 21 and then transmits a signal wirelessly to the receiver 26 of another identical or substantially similar device 10 within the operating range of the respective devices 10. The receiver 26 of the receiving device 10 then sends the voltage to its control module 27 which sends voltage to the vibratory device 80 of the receiving device, alerting the person wearing the device 10 via vibration. The person who was alerted can depress the transmit button 50 on his/her own device 10 and send a wireless signal back to the original sender using the same means to signal that they received the alert. In essence, two-way wireless communication using vibration rather than sound is achieved using paired devices 10.

In one embodiment the vibration device 80 may be any vibration device such as vibration motor with an off-balance cam. In one embodiment the vibration device 80 is a coin vibrator motor such as are commercially available for example from alibaba.com. Coin vibrating motors are generally constructed from a flat PCB on which the 3-pole commutation circuit is laid out around an internal shaft in the center. The vibration motor rotor consists of two voice coils and a small mass integrated into a flat plastic disc with a bearing in the middle, which sits on a shaft. Two brushes on the underside of the plastic disc make contact to the PCB commutation pads, to provide power to the voice coils which generate a magnetic field. This field interacts with the flux generated by a disc magnet that is attached to the motor chassis. The commutation circuit alternates the direction of the field through the voice coils, and this interacts with the N-S pole pairs that are built into a neodymium magnet. The disc rotates, and due to the built in off-center eccentric mass, the motor vibrates.

In one embodiment the vibration device 80 is located within housing 22 of unit 20 and operable to vibrate upon receipt of a signal by the transmitter/receiver unit 20. In another embodiment, the vibration device 80 may be connected to unit 20 such as via an insulated wire pigtail of any suitable length, and mounted to a position remote from the unit 20. It will be understood that the vibration device 80 is best suited to be mounted in a location where the vibration thereof will be immediately detected by a user. For example, in the case of a tree worker, when the vibration device 80 is positioned within the unit 20, the entire unit should be mounted in a location where a worker using the device will instantly feel the vibration. In such a case, a desirable mounting location is inside the helmet of the worker using the device, so that the unit 20 may contact the head of the user. In another embodiment, the device 10 may include plural vibration devices 80, for example one such device 80 in the unit 20 and another vibration device 80 remotely connected to the unit 20.

For applications in which the device 10 is deployed in connection with a helmet or other safety equipment, the unit 20 desirably includes a display that is readable by the user, to ensure the proper channel is being used, and a power indicator and battery life indicator to enable the user to determine the device 10 is ready to be used and has sufficient battery life for the particular job. It is also desirable that in embodiments in which the unit 20 employs a rechargeable battery, the unit is rechargeable while in the helmet or other safety device.

Given the expected use of the device 10 in outdoor environments, in one embodiment the transmit button 50 and vibration device 80 are waterproof and dustproof.

It will be recognized that the device 10 is best suited for use with teams of at least two workers. Accordingly in one or more embodiments the transmitter/receiver unit 20 is operable on multiple frequencies and/or multiple channels. This facilitates multiple crews working near one another without interference and permits multiple crews or people to work or be in the same area without signaling an unintended recipient. The device may operate similar to a multi-channel device such as a garage door opener, which may use the bandwidth but adjust the frequency within that bandwidth. The device 10 may use any frequency range, for example, 433 Mhz wireless transmission. In one embodiment, the multi-channel aspect of the unit may be established by a channel switch operable to adjust the frequency within the 433 Mhz bandwidth, e.g., 433.01, 433.02. 433.03, etc. 433 Mhz is widely used because it is not an emergency frequency and does not interrupt emergency communication. It is also license free and unprotected. The operating range may be any suitable range, for example, 10-5,000 ft., preferably 300 ft. to 3,000 ft. and most preferably about 500 ft. (line of sight).

Figure 1B:
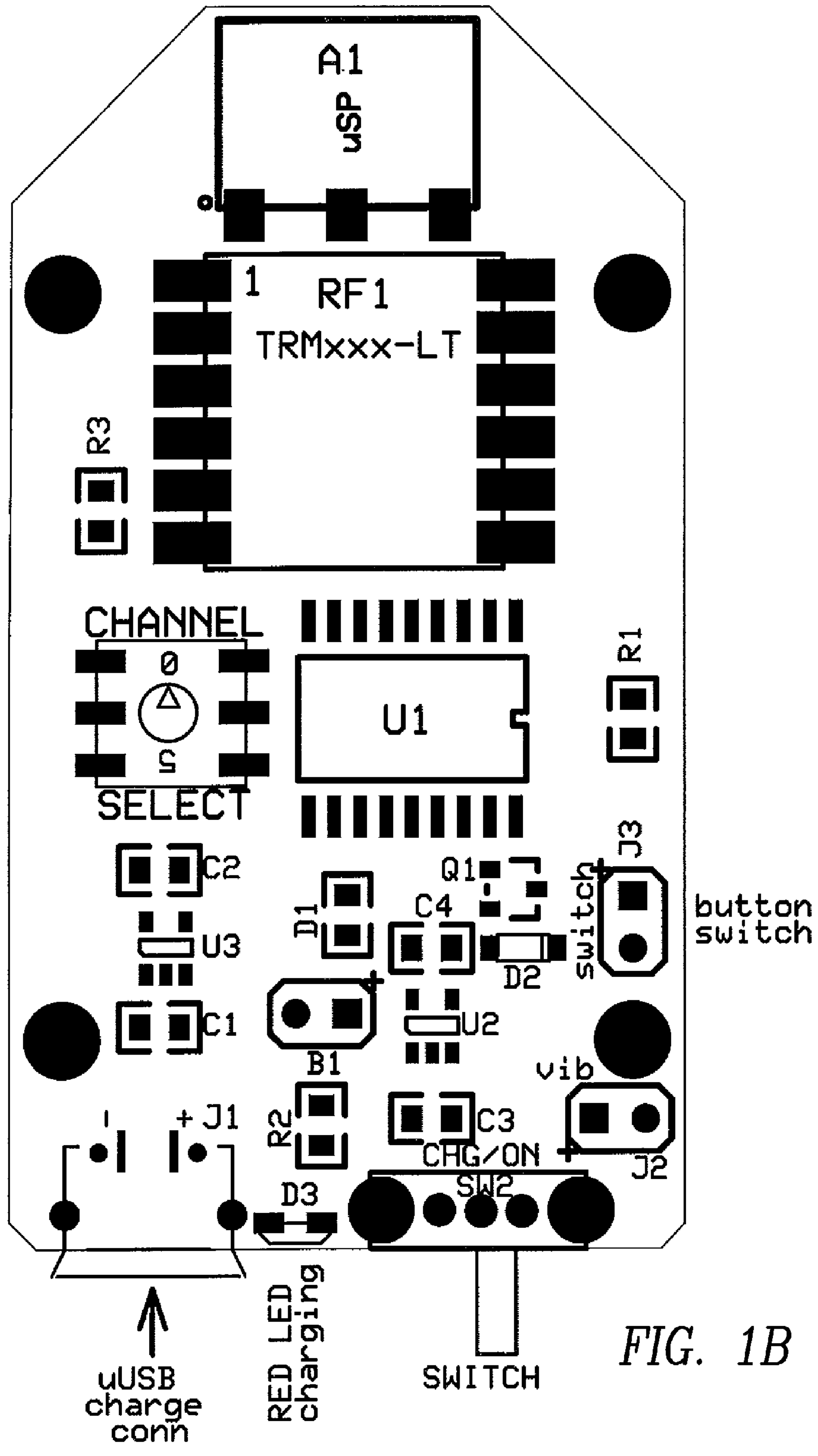
FIG. 1B is a schematic view of a device in accordance with one or more embodiments of the disclosed subject matter.
Figure 1C:
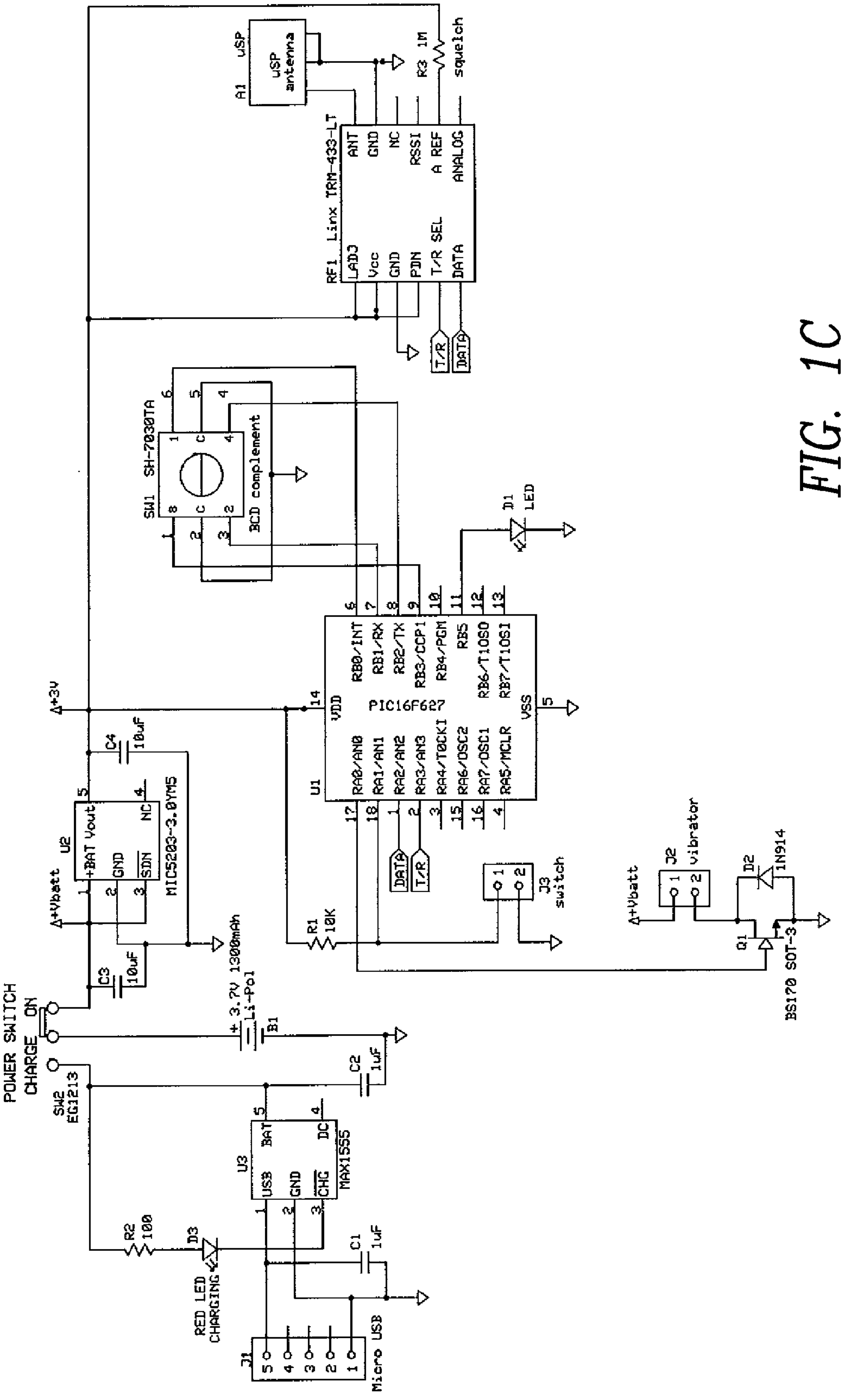
FIG. 1C is a schematic view of a device in accordance with one or more embodiments of the disclosed subject matter.

Now referring to FIGS. 1B and 1C, embodiments of a transmitter/receiver unit 20 layout in accordance with the presently disclosed subject matter are shown. For purposes of illustration and not by way of limitation, the following exemplary components, all available from Digi Key of Thief River Falls, Minn. may be employed (part numbers in parentheses): A1—LINX CHIP antenna; 2C1,2 1 uF (478-6694-1-ND); C3,4—10 uF 25V 20% X5R (445-14388-1-ND); D1-RED LED 0805 SMD (160-1415-1-ND); D2—1N914 (1N4148WTPMSCT-ND); D3—RED LED SIDE EMIT SMD (754-1062-1-ND); J1—micro USB jack (609-4048-1); J3—12 mm TACT switch SM (SW1278TR-ND); Q1—BS170 SOT-3 (BS170FCT-ND); R1—10K 0805 0.25 W resistor (RMCF0805JT10K0CT; R2—100 0805 0.25 W resistor (RMCF0805JT100CT); R3—1M 0805 0.25 W resistor (RMCF0805JT1M00CT); RF1—Linx TRM-433-LT radio chip (TRM-433-LT-ND); SW1—SH-7030TA rotary BCD switch (563-1208-2-ND); SW2—EG1213 SPDT slide switch (EG1906-ND); U1—PIC16F627 microcontroller (PIC16F627A-E/SO-ND); U2—MIC5203-3.0YM5 vreg (576-2727-1-ND); U3—MAX1555 charge controller (MAX1555EZK+TCT-ND) and a printed circuit board.

In one embodiment an FM module is employed which may be operable to provide bidirectional wireless transfer of serial data, control or command information in the 260-470 MHz band. The transceiver is capable of generating +10 dBm into a 50-ohm load and achieves an typical sensitivity of −112 dBm. Its architecture may deliver stability and frequency accuracy and minimizes the effects of antenna pulling. When paired, the transceivers of devices 10 form a reliable wireless link that is capable of transferring data at rates of up to 10,000 bps over distances of up to 3,000 feet. Applications operating over shorter distances or at lower data rates also benefit from increased link reliability and superior noise immunity. The transceiver may be housed in a reflow-compatible SMD package and the transceiver requires no external RF components except an antenna, which greatly simplifies integration and lowers assembly costs.

Any suitable antenna can be paired with the transceiver for optimum power and for providing a desirable minimum range, such as at least 400 ft. For example a whip antenna may be employed.

In one embodiment the control module 27 provides single cycle instructions (200 ns), except for program branches which may be two-cycle. An exemplary operating speed of DC—20 MHz clock input and DC—200 ns instruction cycle is achievable. The device may include interrupt capability, 16 special function hardware registers, an 8-level deep hardware stack and direct, indirect and relative addressing modes.

Peripheral features may include 16 I/O pins with individual direction control, high current sink/source for direct LED drive, and an analog comparator module with two analog comparators, programmable on-chip voltage reference, (VREF) module, programmable input multiplexing from device inputs and internal voltage reference, and comparator outputs that are externally accessible. Timers may include an 8-bit timer/counter with 8-bit programmable prescaler, a 16-bit timer/counter with external crystal/clock capability, and an 8-bit timer/counter with 8-bit period register, prescaler and postscaler. Capture, compare PWM (CCP) module may provide a 16-bit, max. resolution 12.5 ns capture, 16-bit, max. resolution 200 ns compare and 10-bit PWM. A Universal Synchronous/Asynchronous Receiver/Transmitter (USART/SCI) provides 16 bytes of common RAM.

Control module features may include Power-on Reset (POR), Power-up Timer (PWRT) and Oscillator Start-up Timer (OST), Brown-out Detect (BOD), Watchdog Timer (WDT) with its own on-chip RC oscillator for reliable operation, multiplexed MCLR-pin, programmable weak pull-ups on PORTB, programmable code protection, low voltage programming, power saving SLEEP mode, selectable oscillator options including FLASH configuration bits for oscillator options and External Resistor (ER) oscillator, dual speed INTRC, In-circuit serial programming (via two pins), and four user programmable ID locations.

A wide operating voltage range is desirable, for example 2.0V or 3.0V to 5.5V.

The unit 20 may include a rechargeable battery such as a 3.7 volt lithium, rechargeable battery. The battery may be chargeable via a micro USB charging port mounted to the pc board. The charge rate is controlled by the control module. When the battery is full it is indicated by a led bulb. In one embodiment the battery is a 3.7V 450 mAH battery available from Tenergy of Fremont, Calif.

Figure 2:
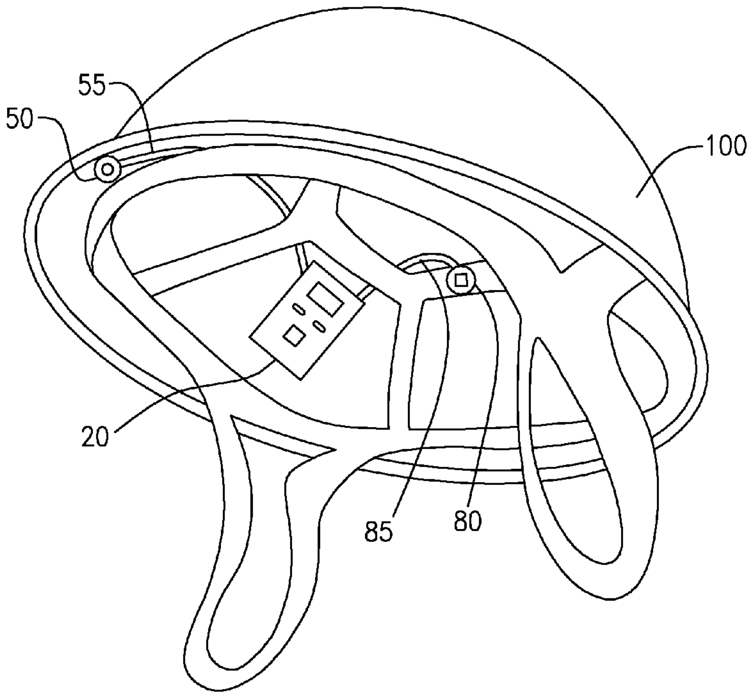
FIG. 2 is a bottom perspective view a helmet including a device in accordance with one or more embodiments of the disclosed subject matter.

With reference to FIG. 2, the device 10 may be mounted to headwear such as a helmet 100, hardhat or the like. Transmitter/receiver device 20 may be for example removably mounted on the inside of a helmet 100 by any suitable means, such as by hook and loop fasteners, in a pouch, by a loop of fabric or other material to a helmet suspension strap, etc. Similarly, the transmit button 50 and vibration device 80 may be removably mounted to the helmet 100. Velcro® hook and loop fasteners may be adhesively fixed to the interior of the helmet in locations where fixation of the device 20, transmit button 50 and vibration device 80 are desired. Alternatively, device 20, transmit button 50 and vibration device 80 may be permanently fixed and/or integrated in a helmet 100 or other headwear. Likewise, the device 10 may be integrated as a permanent feature of the helmet 100 or other safety equipment. Transmit button 50 may be connected to device 20 by any suitable wire or cable 55 and vibration device 80 may be connected to device 20 by any suitable wire or cable 85.

The transmit button 50 and the vibration device 80 are small enough so that they do not interfere with the user's normal activity. The transmit button 50 is desirably mounted in a position that is easy for the user to access, such as beneath the brim of the helmet 100 or on an inside surface near an edge of the helmet 100. Regardless of how the components 20, 50 and 80 are mounted, the vibration device 80 is positioned to be in vibrational contact with the user when the helmet 100 is worn. It will be apparent that the transmitter/receiver unit 20 may be positioned anywhere on the body of a user, such as but not limited to clothing such as a belt or belt loop, a pocket, a strap disposed around a limb or torso, etc., or directly attached to the body of the user. Similarly, the transmit button 50 and the vibration device 80 may be mounted, fixed or otherwise positioned on a user's clothing or directly to a body part of a user.

Although the apparatus and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

What is claimed is:

1. A helmet comprising a personal alert device operable to use vibration to provide an alert to a wearer of the helmet, the device comprising a transmitter/receiver unit removably mountable to the helmet, a transmit button operably connected to the transmitter/receiver unit and removably mountable to the helmet, and at least one vibration device operably connected to the transmitter/receiver unit and removably mountable to the helmet, wherein the at least one vibration device is mountable in a position on the helmet operable to provide a vibratory sensation to a head of a wearer of the helmet upon vibration of the vibration device, and wherein the helmet comprises a plurality of fasteners positioned on the helmet to removably fasten the transmitter/receiver unit, the transmit button and the at least one vibration device in positions desired by the user.

2. The device of claim 1 wherein the transmitter/receiver unit comprises a display screen.

3. The device of claim 1 wherein the transmitter/receiver unit further comprises a rechargeable battery and a recharging port.

4. The helmet of claim 1 wherein the transmitter/receiver unit comprises a housing, a wireless transmitter, a wireless receiver, a control module and an antenna.

5. The device of claim 4 wherein the housing is 0.5 to 4 inches in width and 0.5 to 4 inches in length.

6. The device of claim 4 wherein the antenna is an FM frequency antenna.

7. The device of claim 4 comprising a vibration device positioned within the housing and operable to vibrate upon receipt of a signal by the transmitter/receiver unit.

8. The device of claim 1 wherein the transmit button is removably connectable to the transmitter/receiver unit.

9. The device of claim 1 wherein the vibration device is removably connectable to the transmitter/receiver unit.

10. The device of claim 1 wherein the vibration device is a vibration motor.

11. The device of claim 1 wherein the vibration device is a coin vibrating motor.

12. The device of claim 1 wherein the at least one vibration device is mountable to a position remote from the transmitter/receiver unit.

13. The device of claim 1 wherein the transmit button is mountable to a position remote from the transmitter/receiver unit.

14. The device of claim 1 wherein the transmitter/receiver unit is operable to receive and transmit signals on multiple frequencies and comprises a multi-channel switch.

15. The helmet of claim 1 wherein the transmit button is removably mountable to a front edge of the helmet.

16. A communication system comprising a plurality of helmets comprising a personal alert device, each of the devices operable to use vibration to provide an alert to a wearer of the helmet, each of the plurality of personal alert devices comprising a transmitter/receiver unit removably mountable to the helmet, a transmit button operably connected to the transmitter/receiver unit and removably mountable to the helmet and at least one vibration device operably connected to the transmitter/receiver unit and removably mountable to the helmet, wherein the transmitter/receiver unit comprises a housing, a wireless transmitter, a wireless receiver, a control module and an antenna and is operable to receive and transmit signals on multiple frequencies and comprises a multi-channel switch, and wherein the helmet comprises a plurality of fasteners positioned on the helmet to removably fasten the transmitter/receiver unit, the transmit button and the at least one vibration device in positions desired by the wearer.

* * * * *